United States Patent
Pawar et al.

(10) Patent No.: US 9,608,794 B2
(45) Date of Patent: Mar. 28, 2017

(54) SYSTEMS AND METHODS FOR SCHEDULING TRANSMISSIONS BETWEEN AN ACCESS NODE AND WIRELESS DEVICES

(71) Applicant: Sprint Spectrum LP, Overland Park, KS (US)

(72) Inventors: Hemanth Pawar, Brambleton, VA (US); Shilpa Kowdley, Brambleton, VA (US); Krishna Sitaram, Chantilly, VA (US); Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 208 days.

(21) Appl. No.: 14/454,945

(22) Filed: Aug. 8, 2014

(65) Prior Publication Data
US 2016/0043857 A1  Feb. 11, 2016

(51) Int. Cl.
*H04L 5/00* (2006.01)

(52) U.S. Cl.
CPC ............ *H04L 5/0069* (2013.01); *H04L 5/006* (2013.01)

(58) Field of Classification Search
CPC .. H04W 72/12; H04W 28/0231; H04W 28/08
See application file for complete search history.

(56) References Cited

U.S. PATENT DOCUMENTS

| | | | |
|---|---|---|---|
| 2009/0046632 A1 | 2/2009 | Nanda et al. | |
| 2010/0216486 A1 | 8/2010 | Kwon et al. | |
| 2012/0157108 A1* | 6/2012 | Boudreau | H04W 16/32 455/450 |
| 2013/0065599 A1* | 3/2013 | Chan | H04W 16/18 455/446 |
| 2013/0272170 A1* | 10/2013 | Chatterjee | H04W 28/02 370/280 |
| 2014/0086198 A1 | 3/2014 | Andrews et al. | |
| 2014/0122957 A1 | 5/2014 | Charbit et al. | |
| 2014/0161001 A1 | 6/2014 | Gao et al. | |
| 2014/0362829 A1* | 12/2014 | Kazmi | H04W 36/22 370/332 |

FOREIGN PATENT DOCUMENTS

EP    2180739 A1    4/2010

OTHER PUBLICATIONS

International Search Report and Written Opinion for PCT/US2015/044199 mailed Oct. 30, 2015.

\* cited by examiner

*Primary Examiner* — Siming Liu (57) ABSTRACT

Systems and methods are described for scheduling transmissions between an access node and wireless devices. A location may be determined for a plurality of small cells within an access node signal area. Based on the determined locations, a frame structure may be selected for the access node used to communicate with a plurality of wireless devices. Data may then be communicated between the access node and a plurality of wireless devices based on the selected frame structure.

18 Claims, 9 Drawing Sheets

SYSTEMS AND METHODS FOR SCHEDULING TRANSMISSIONS BETWEEN AN ACCESS NODE AND WIRELESS DEVICES

TECHNICAL BACKGROUND

Telecommunication systems, such as cellular networks or other wireless networks, use various network links throughout the network to communicate. For example, an access node may use a network link to communicate with another access node while using a separate network link to communicate with another processing node. Accordingly, the system may rely on a well-established network to provide efficient communication services.

In certain circumstances, a portion of the network may experience high load (e.g., load above a threshold). For example, a communication link may experience large amount of data traffic. Here, the efficiency of the system may suffer due to excessive load on a portion of the system. Accordingly, a system that effectively balances load and distributes traffic throughout the system may be able to provide a high quality service to users of the system.

OVERVIEW

Systems and methods are described for scheduling transmissions between an access node and wireless devices. A location may be determined for a plurality of small cells within an access node signal area. Based on the determined locations, a frame structure may be selected for the access node used to communicate with a plurality of wireless devices. Data may then be communicated between the access node and a plurality of wireless devices based on the selected frame structure.

DETAILED DESCRIPTION

Figure 1:
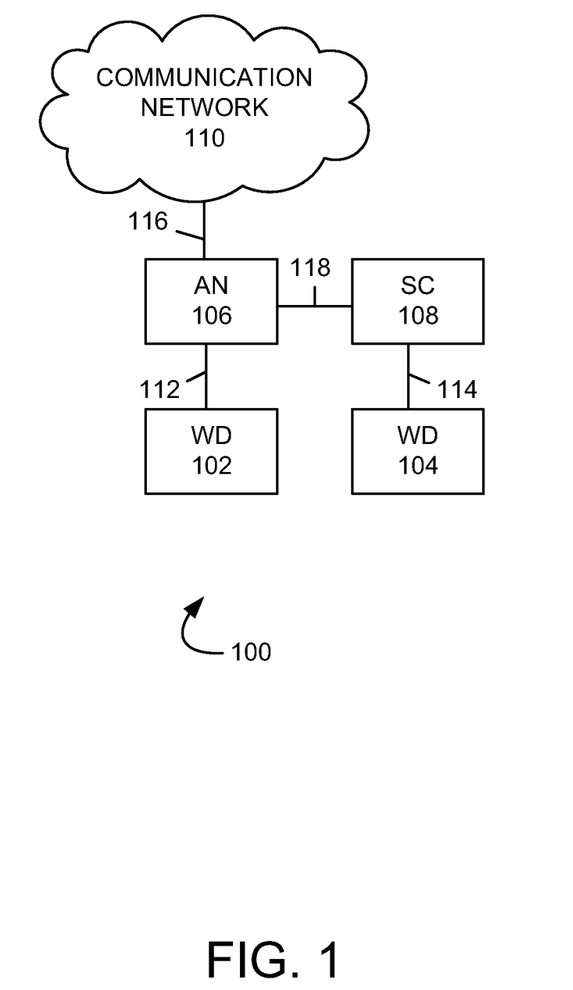
FIG. 1 illustrates an exemplary communication system to schedule transmissions between an access node and wireless devices.

FIG. 1 illustrates an exemplary communication system 100 to schedule transmissions between an access node and wireless devices comprising wireless devices 102 and 104, access node 106, small cell 108, communication network 110, and communication links 112, 114, 116, and 118. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 106, small cell 108, and communication network 110 which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access node 106 and small cell 108, any number of wireless devices can be implemented.

Access node 106 and small cell 108 are network nodes capable of providing wireless communications to wireless devices 102 and 104, and can be, for example, a base transceiver station, a radio base station, an eNodeB device, or an enhanced eNodeB device. In an embodiment, access node 106 may comprise a macro cell while small cell 108 may comprise a small cell (e.g., femto cell, pico cell, micro cell, or the like) such that the signal area (e.g., area around each node where a wireless device may detect wireless signals transmitted from the node at a signal level above a threshold) for the macro cell is larger than the signal area for the small cell. As such, a macro cell may transmit wireless signals with a greater signal level (e.g., use a higher transmission power) than a small cell. Access node 106 may communicate with communication network 110 over communication link 116. Small cell 108 may communicate with communication network 110 via access node 106 or using a separate communication link (not illustrated). Access node 106 and small cell 108 may also communicate directly with each other over communication link 118.

Although only access node 106 and small cell 108 are illustrated in FIG. 1, wireless devices 102 and 104 can be in communication with a plurality of access nodes and/or small cells. The plurality of access nodes and/or small cells can be associated with different networks and can support different communication protocols and radio access technologies.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also comprise a wireless network, including base stations, wireless communication nodes, telephony switches, internet routers, network gateways, computer systems, communication links, or some other type of communication equipment, and combinations thereof.

Communication links 112, 114, 116, and 118 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2:
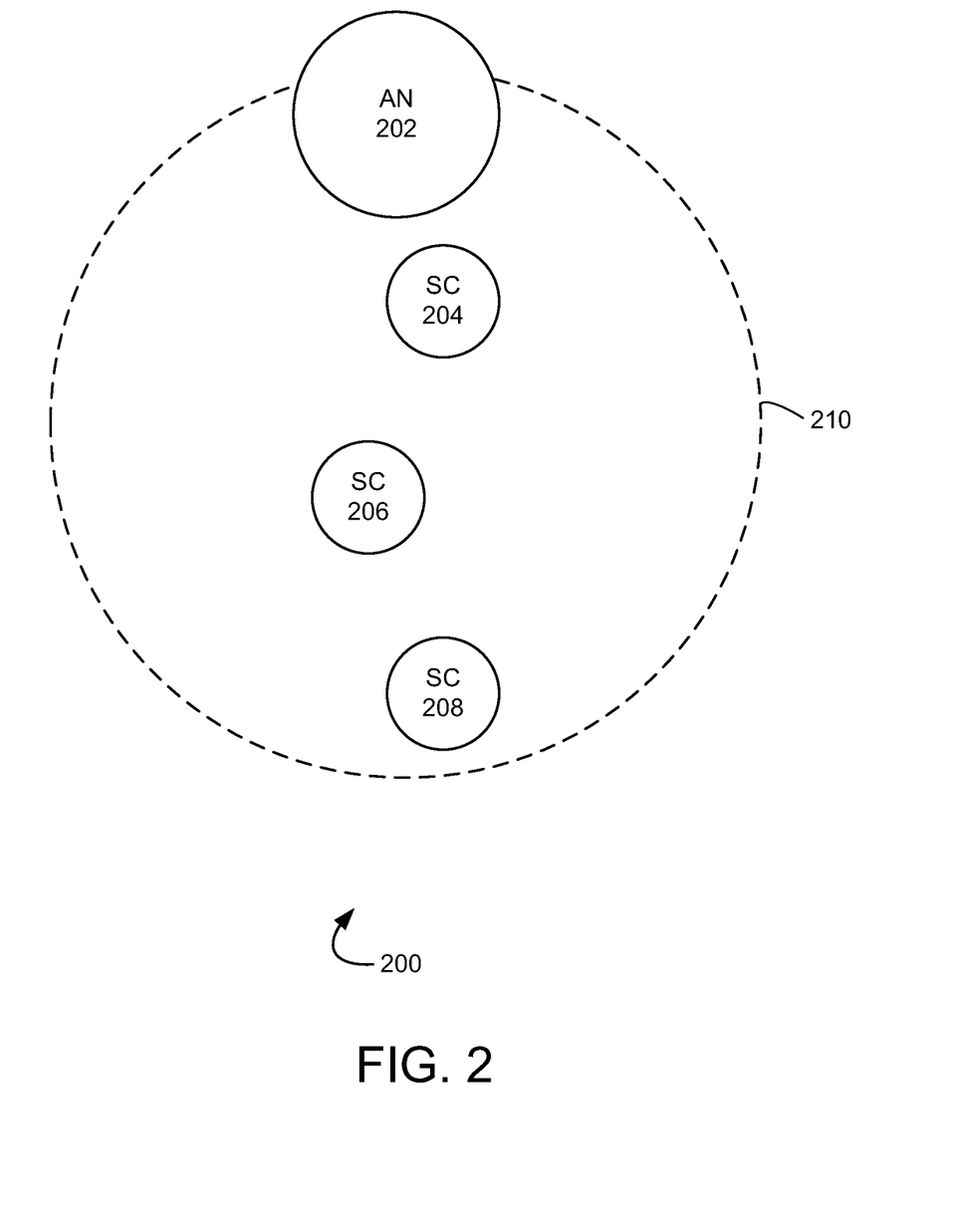
FIG. 2 illustrates another exemplary system to schedule transmissions between an access node and wireless devices.

FIG. 2 illustrates an exemplary communication system 200 for scheduling transmissions between an access node and wireless devices. System 200 comprises access node 202, small cells 204, 206, and 208, and signal area 210. Access node 202 may comprise an access node similar to access node 106 and small cells 204, 206, and 208 may comprise a small cell similar to small cell 108.

In operation, access node 202 may establish communication with one or more wireless devices such that access node 202 provides the wireless devices access to a communication network (e.g., communication network 110). Similarly, small cells 204, 206, and 208 may establish communication with one or more wireless devices such that the small cells provide the wireless devices access to a communication network (e.g., communication network 110).

In an embodiment, access node 202 may comprise a macro cell and small cells 204, 206, and 208 may comprise a small cell (e.g., femto cell, pico cell, micro cell, or the like). For instance, the signal area for the macro cell may be larger than the signal area for the small cell. In an embodiment, one or more of small cells 204, 206, and 208 may communicate with access node 202 in order to communicate with a communication network (e.g., communication network 110).

For example, access node 202 may be in communication with a communication network (e.g., communication network 110) such that the communication network provides wireless services for wireless devices. The Communication network may comprise a core network that includes, for example, a controller node, a gateway node, and any other suitable network elements. In an embodiment, one or more of small cells 204, 206, and 208 may communicate with the communication network using access node 202. For example, small cell 204 may transmit data to access node 202 such that the transmitted data is used to enable one or more wireless devices to access an external network (e.g., the Internet) or to enable the one or more wireless devices to use services provided by the core network (e.g., voice services). In an embodiment, small cells 204, 206, and 208 may directly communicate with the core network (e.g., without access node 202). For example, a backhaul for small cells 204, 206, and 208 may connect to the core network and a communication network (e.g., communication network 110), using a wired or wireless communication link (e.g., not via access node 202).

In an embodiment, access node 202 and small cells 202, 204, and 206 may communicate (e.g., with one or more wireless device) over the air. For example, a plurality of carriers that comprise bandwidth for wireless communications (e.g., 2.5 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers.

In an embodiment, system 200 may leverage access node 202 small cells 204, 206, and 208 in order to provide wireless services over signal area 210. In some examples, small cells 204, 206, and 208 may each comprise a signal area such that the small cells provide wireless services within signal area 210. Here, access node 202 may schedule wireless transmissions between an access node and wireless devices based on the wireless services provided by small cells 204, 206, and 208.

In an embodiment, systems and methods are described for scheduling transmissions between an access node and wireless devices. A location may be determined for a plurality of small cells within an access node signal area. Based on the determined locations, a frame structure may be selected for the access node used to communicate with a plurality of wireless devices. Data may then be communicated between the access node and a plurality of wireless devices based on the selected frame structure.

Figure 3:
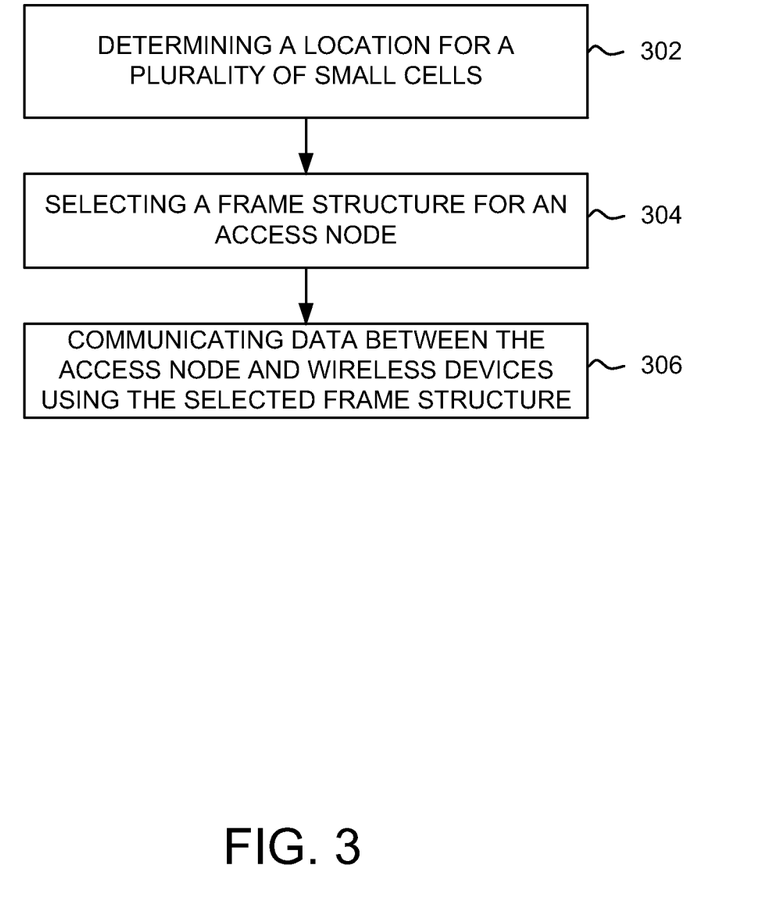
FIG. 3 illustrates an exemplary method of scheduling transmissions between an access node and wireless devices.

FIG. 3 illustrates an exemplary method scheduling transmissions between an access node and wireless devices. The method will be discussed with reference to the exemplary communication system 200 illustrated in FIG. 2, however, the method can be implemented with any suitable communication system.

Referring to FIG. 3, at step 302, locations may be determined for a plurality of small cells. For example, locations may be determined for small cells 204, 206, and 208. The locations may be determined based on accessing a database that stores small cell locations, signal levels detected (e.g., by access node 202 and/or wireless devices) for the small cells within signal area 210, and any other suitable means.

In an embodiment, the determined locations for small cells 204, 206, and 208 may be relative to access node 202 and/or relative to an edge of signal area 210. For example, the determined locations may be based on a distance from access node 202. A location for small cell 204 may comprise close proximity to access node 202 while a location for small cell 208 may comprise close proximity to an edge of signal area 210. In an embodiment, a location for small cell 206 may not comprise close proximity to access node 202 and may not comprise close proximity to an edge of signal area 210. Here, small cell 206 may comprise a location between access node 202 and an edge of signal area 210.

At step 304, frame structure may be selected for the access node based on the determined locations for the small cells. For example, based on the determined locations for small cells 204, 206 and 208, a frame structure may be selected for access node 202. The frame structure may comprise uplink frames, downlink, frames, or various combinations of these.

For example, in a time division duplex (TDD) system, a frame may comprise a number of subframes (e.g. Transmission Time Intervals, TTIs) that include a mix of uplink subframes and downlink subframes. In some embodiments, a special subframe may also be used, for instance, as a guard between an uplink subframe and a downlink subframe or for any other suitable purpose. When using a TDD structure, an uplink subframe and a downlink subframe may be transmitted over the same frequency but at different times. In an embodiment, a frame structure may comprise uplink subframes and/or downlink subframes, where each frame structure may comprise a different mix of subframes. For example, a first frame structure may comprise 10 subframes, where the order of subframes may comprise downlink, special, uplink, uplink, downlink, downlink, special, uplink, uplink, and downlink. A second frame structure may comprise 10 subframes, where the order of subframes may comprise downlink, special, uplink, uplink, downlink, downlink, downlink, downlink, downlink, and downlink.

Other frame structure may comprise various other mixes of special, downlink, and uplink configurations.

At step 306, data may be communicated between the access node and a plurality of wireless devices based on the selected frame structure. For example, access node 202 communicate with a plurality of wireless devices using the selected frame structure. In an embodiment, the communication may comprise communicating data from access node 202 to a wireless device (e.g., downlink communication) using a downlink subframe and communicating data from a wireless device to access node 202 (e.g., uplink communication) using an uplink subframe.

Figure 4:
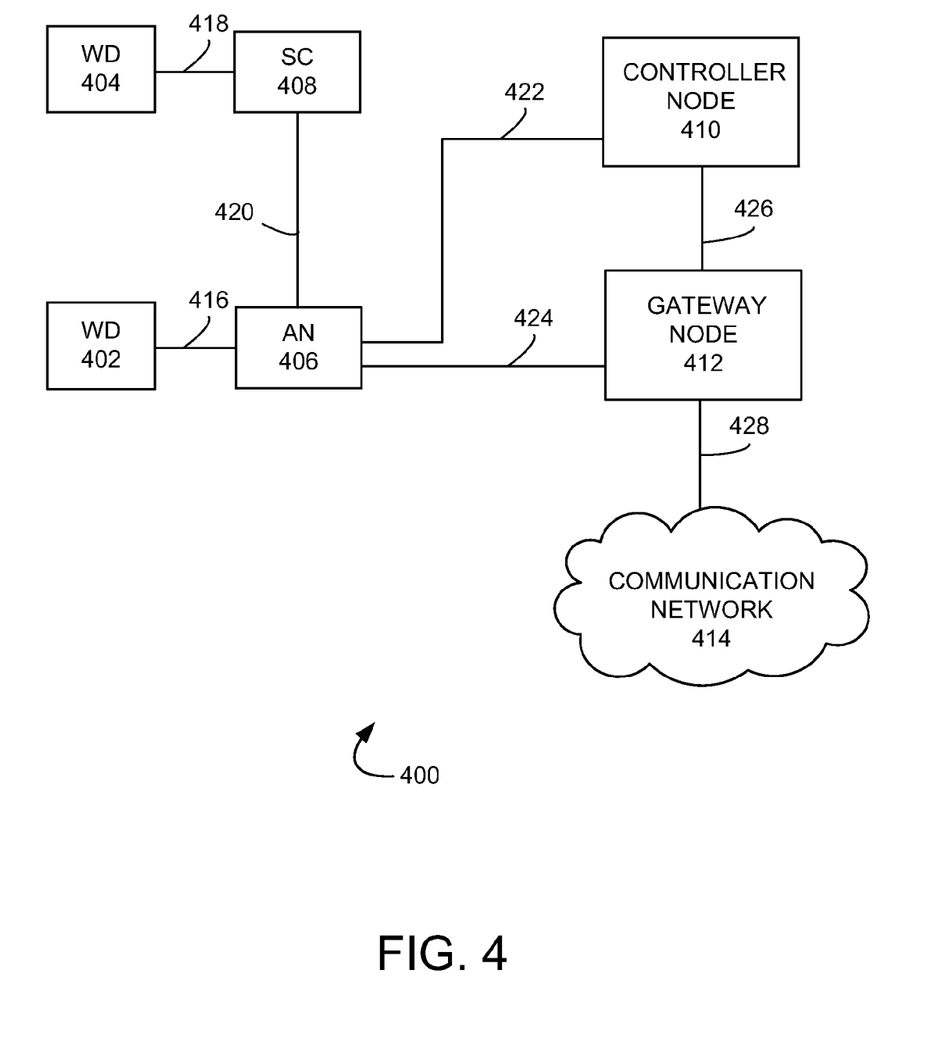
FIG. 4 illustrates another exemplary system to schedule transmissions between an access node and wireless devices.

FIG. 4 illustrates another exemplary communication system 400 to schedule transmissions between an access node and wireless devices. Communication system 400 may comprise a wireless devices 402 and 404, access node 406, small cell 408, controller node 410, gateway node 412, communication network 414, and communication links 416, 418, 420, 422, 424, 426, and 428. Other network elements may be present in the communication system 400 to facilitate communication but are omitted for clarity, such as base stations, base station controllers, gateways, mobile switching centers, dispatch application processors, and location registers such as a home location register or visitor location register.

Wireless devices 402 and 404 can be any device configured to communicate over communication system 400 using a wireless communication link. For example, wireless devices 402 and 404 can include a cell phone, a smart phone, a computing platform such as a laptop, palmtop, or a tablet, a personal digital assistant, or an internet access device, and combinations thereof.

Access node 406 and small cell 408 are network nodes capable of providing wireless communications to wireless devices 402 and 404, and can be, for example, a base transceiver station, a radio base station, an eNodeB device, or an enhanced eNodeB device. In an embodiment, access node 406 may comprise a macro cell while small cell 408 may comprise a small cell (e.g., femto cell, pico cell, micro cell, or the like) such that the signal area (e.g., the area around each node where a wireless device may detect wireless signals transmitted from the node at a signal level above a threshold) for the macro cell is larger than the signal area for the small cell. As such, a macro cell may transmit wireless signals with a greater signal level (e.g., use a higher transmission power) than a small cell. In an embodiment, access node 406 can comprise a serving access node for wireless device 402 and rely node 408 can comprise a serving access node for wireless device 404. Access node 406 may communicate with controller node 410 over communication link 422 and with gateway node 412 over communication link 424. Access node 406 and small cell 408 may also communicate directly with each other over communication link 420. In an embodiment, rely node 408 can communicate directly with controller node 410 and gateway node 412 over communication links (not depicted).

Controller node 410 can be any network node configured to manage services within system 400. Controller node 410 may provide other control and management functions for system 400. The controller node 410 can be a single device having various functions or a plurality of devices having differing functions. For example, controller node 410 can include at least one of a multi-cell/multicast coordination entity (MCE), a mobility management entity (MME), a radio network controller (RNC), a mobile switching center (MSC), and a combination thereof.

Controller node 410 can comprise a processor and associated circuitry to execute or direct the execution of computer-readable instructions to obtain information. Controller node 410 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 410 can receive instructions and other input at a user interface. Controller node 410 can comprise a processor and associated circuitry to execute or direct the execution of computer-readable instructions to obtain information.

Gateway node 412 is a network element which can comprise a processor and associated circuitry to execute or direct the execution of computer-readable instructions. Gateway node 412 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 412 can provide instructions to access node 406 and small cell 408 related to channel selection in communications with wireless devices 402 and 404. For example, gateway node 412 can comprise at least one of a serving gateway (SGW), a packet data network gateway (PDNGW), a cellular gateway (CGW), and a combination thereof.

Communication network 414 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 414 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 414 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 416, 418, 420, 422, 424, 426, and 428 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 406 and small cell 408, controller node 410, gateway node 412, and communication network 414 which are omitted for clarity, including additional processing nodes, routers, gateways, and physical and/or wireless data links for carrying data among the various network elements.

Figure 6:
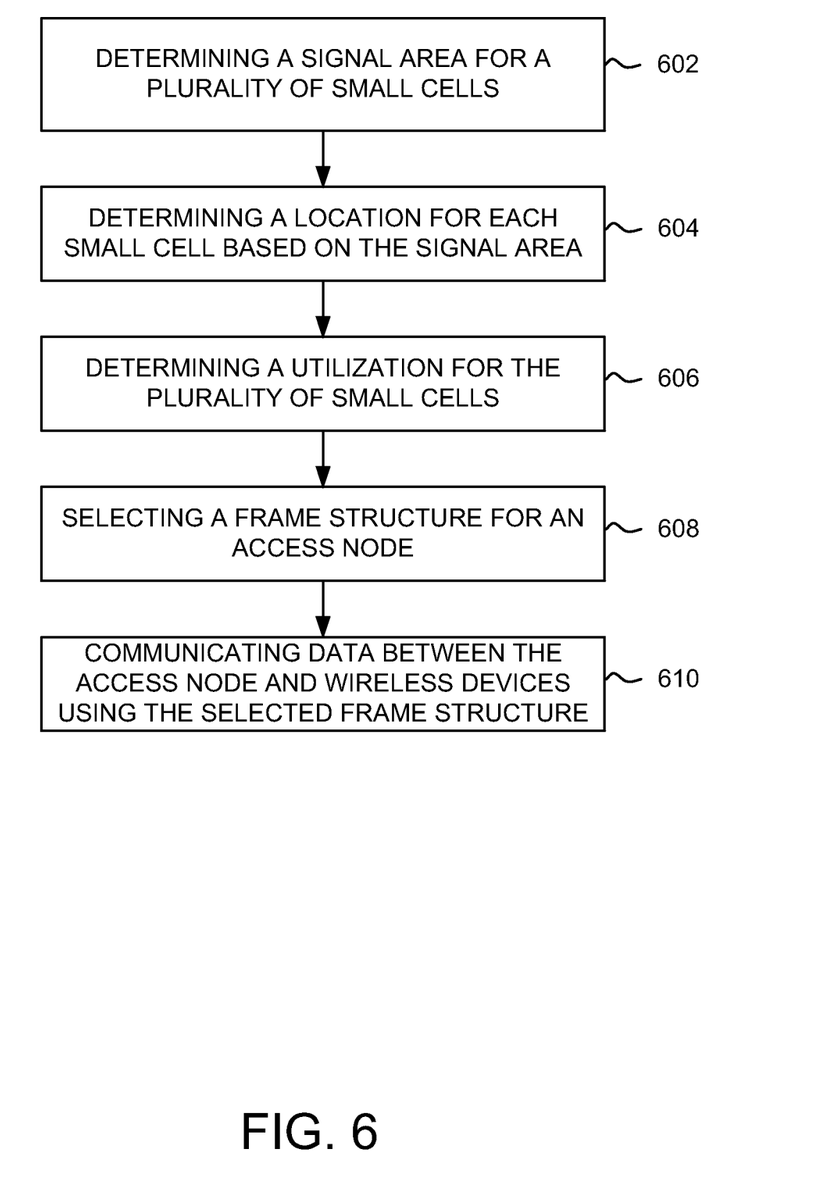
FIG. 6 illustrates another exemplary method of scheduling transmissions between an access node and wireless devices.

In an embodiment, any of controller node 410, gateway node 412, one or more modules of access node 406, and one or more modules of small cell 408 may perform all or parts of the methods of FIGS. 3 and 6.

Figure 5A:
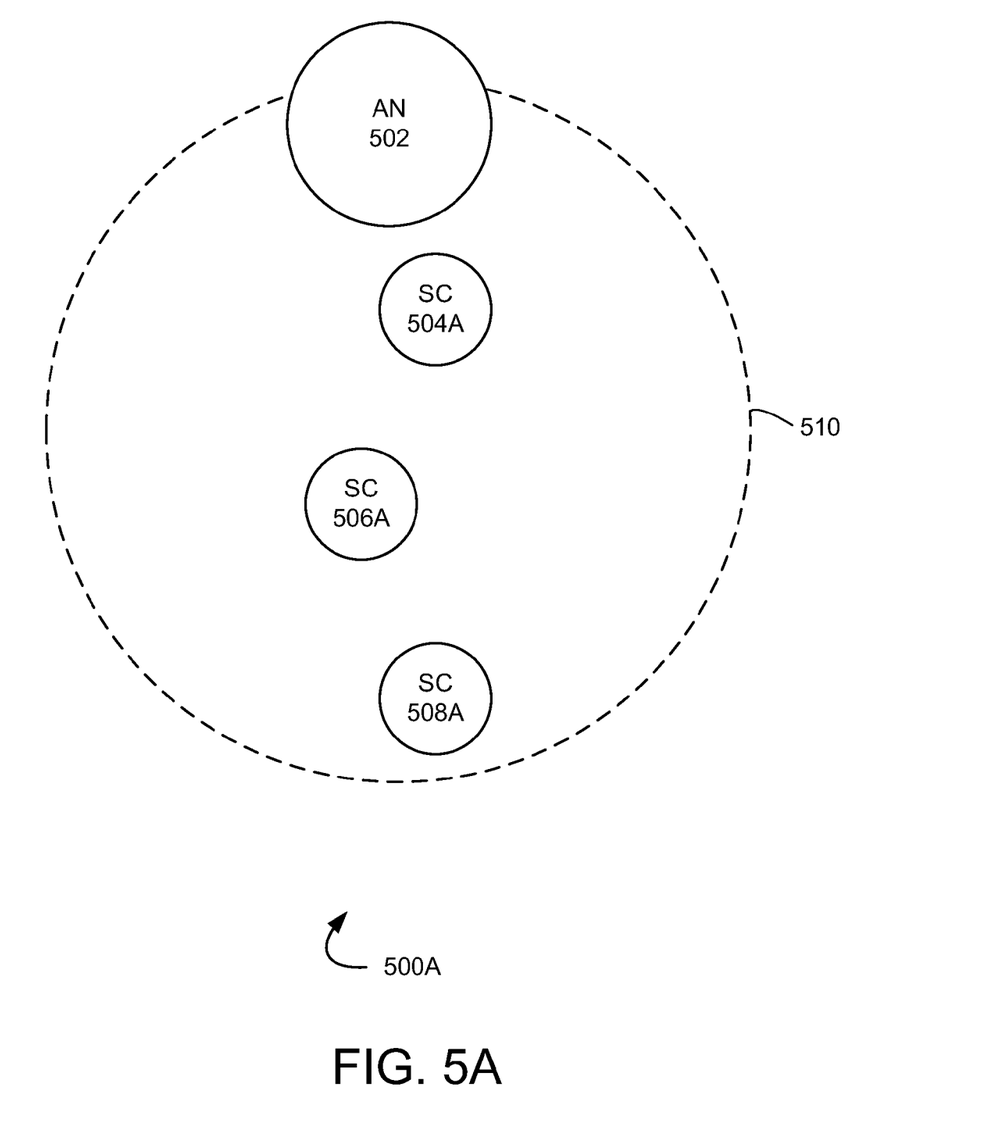
FIGS. 5A-5C illustrate exemplary systems to schedule transmissions between an access node and wireless devices.
Figure 5B:
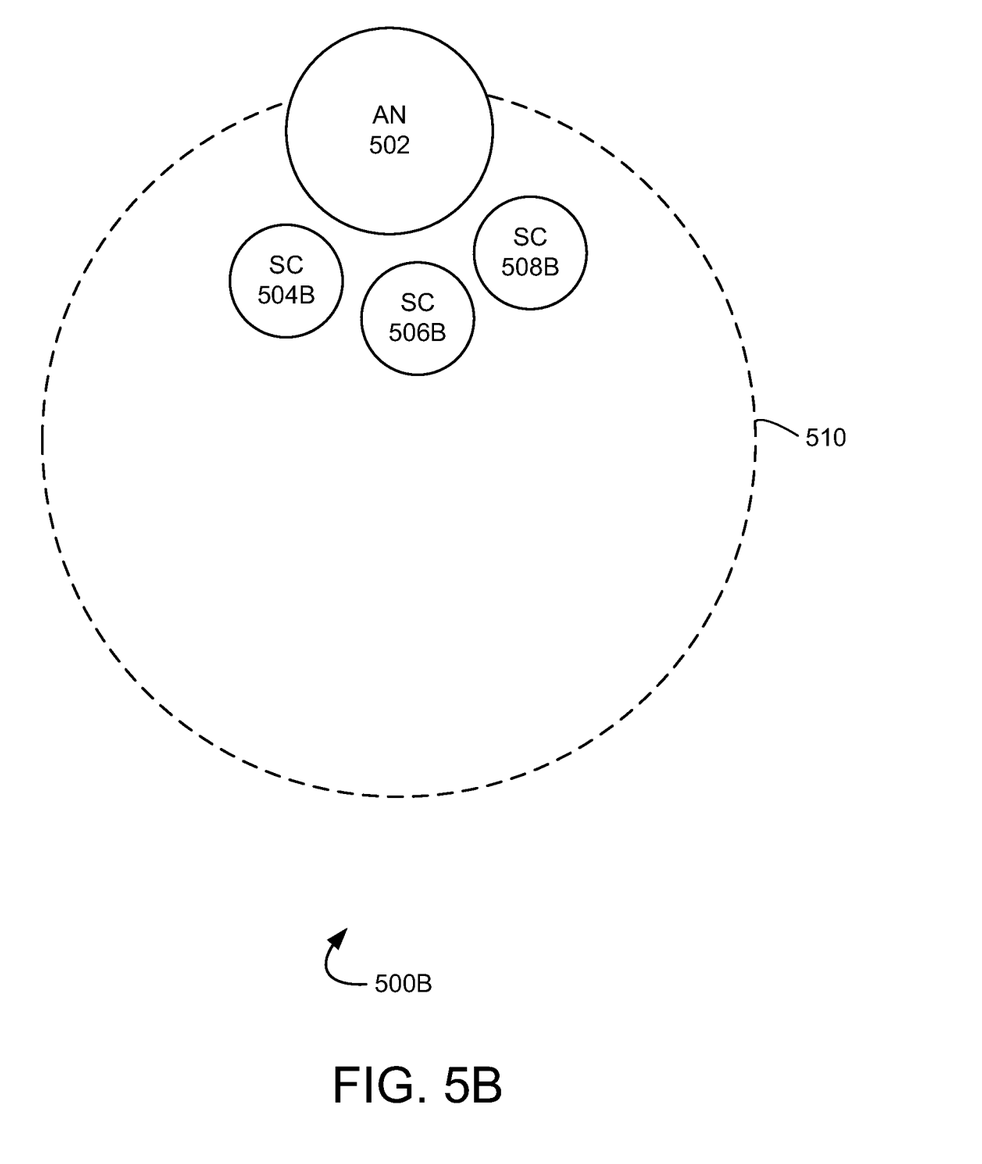
Figure 5C:
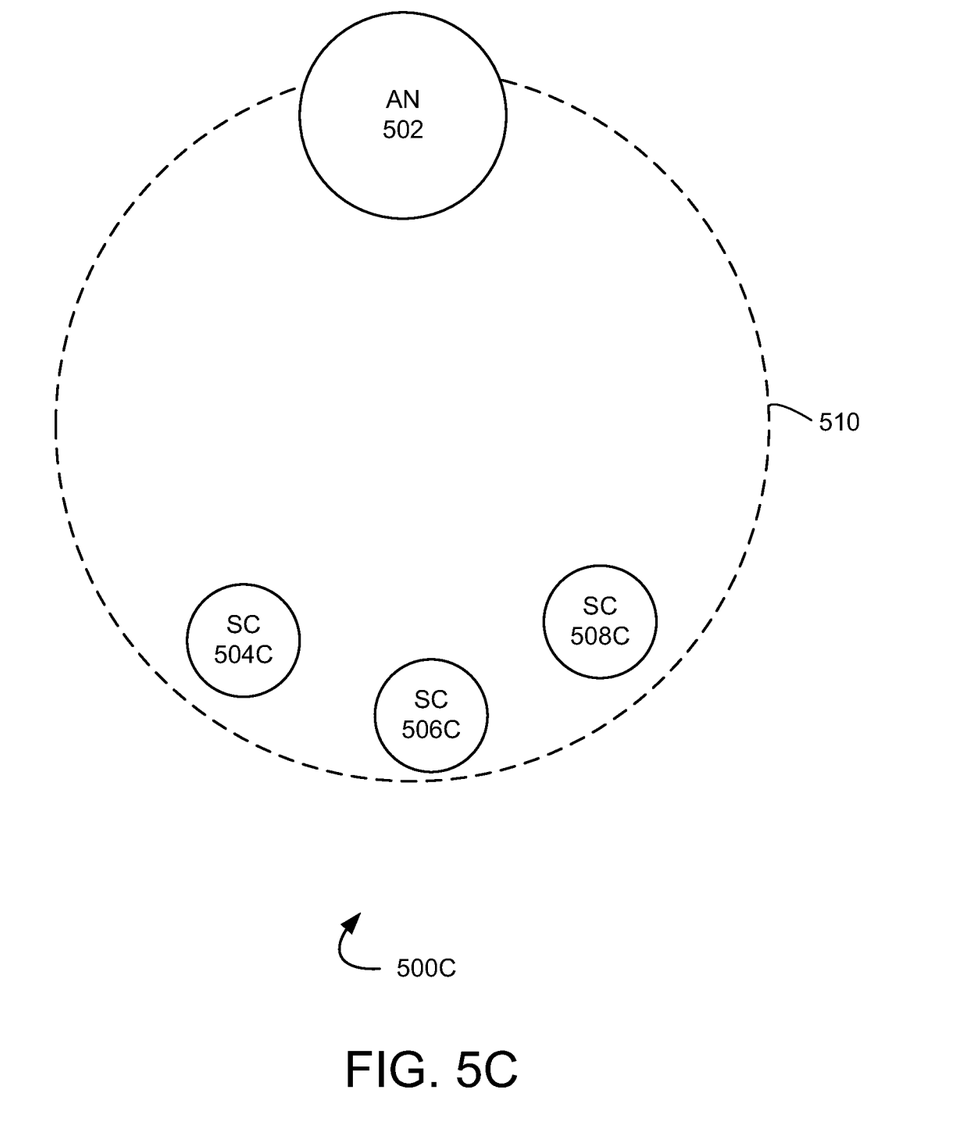

FIGS. 5A-5C illustrate exemplary communication systems 500A-500C for scheduling transmissions between an access node and wireless devices. Systems 500A-500C comprise access node 502, small cells 504A, 506A, 508A, 504B, 506B, 508B, 504C, 506C, and 508C, and signal area 510. Access node 502 may comprise an access node similar to access node 406 and small cells 504A, 506A, 508A, 504B, 506B, 508B, 504C, 506C, and 508C may comprise a small cell similar to small cell 408. In an embodiment, systems 500A-500C may depict various network configurations for small cells (e.g., based on small cell locations).

In operation, access node 502 may establish communication with one or more wireless devices such that access node 502 provides the wireless devices access to a communication network (e.g., communication network 414). Similarly, small cells 504A, 506A, 508A, 504B, 506B, 508B, 504C, 506C, and 508C may establish communication with one or more wireless devices such that the small cells provide the wireless devices access to a communication network (e.g., communication network 414).

In an embodiment, access node 502 may comprise a macro cell and small cells 504A, 506A, 508A, 504B, 506B, 508B, 504C, 506C, and 508C may comprise a small cell (e.g., femto cell, pico cell, micro cell, or the like). For instance, the signal area for the macro cell may be larger than the signal area for the small cell. In an embodiment, one or more of small cells 504A, 506A, 508A, 504B, 506B, 508B, 504C, 506C, and 508C may communicate with access node 502 in order to communicate with a communication network (e.g., communication network 414).

For example, access node 502 may be in communication with a core network such that the core network provides wireless services for wireless devices. The core network may comprise, for example, a controller node (e.g., controller node 410), a gateway node (e.g., gateway node 412), and any other suitable network elements. In an embodiment, one or more of small cells 504A, 506A, 508A, 504B, 506B, 508B, 504C, 506C, and 508C may communicate with the core network using access node 502. For example, small cell 504A may transmit data to access node 502 such that the transmitted data is used to enable one or more wireless devices to access an external network (e.g., the Internet) or to enable the one or more wireless devices to use services provided by the core network (e.g., voice services). In an embodiment, one or more of small cells 504A, 506A, 508A, 504B, 506B, 508B, 504C, 506C, and 508C may directly communicate with the core network (e.g., without access node 502). For example, a backhaul for small cells 504A, 506A, 508A, 504B, 506B, 508B, 504C, 506C, and 508C may connect to the core network and a communication network (e.g., communication network 414), using a wired or wireless communication link (e.g., not via access node 502).

In an embodiment, access node 502 and small cells 504A, 506A, 508A, 504B, 506B, 508B, 504C, 506C, and 508C may communicate (e.g., with one or more wireless device) over the air. For example, a plurality of carriers that comprise bandwidth for wireless communications (e.g., 2.5 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers.

In an embodiment, systems 500A-500C may leverage access node 502 and small cells 504A, 506A, 508A, 504B, 506B, 508B, 504C, 506C, and 508C in order to provide wireless services over signal area 510. In an embodiment, as depicted in system 500C, small cells 504C, 506C, and 508C may be located proximate to the edge of signal area 510. As depicted in system 500B, small cells 504B, 506B, and 508B may be located proximate to access node 502. As depicted in system 500A, small cells 504A, 506A, and 508A may be scattered throughout signal area 510. In some examples, small cells 504A, 506A, 508A, 504B, 506B, 508B, 504C, 506C, and 508C may each comprise a signal area such that the small cells provide wireless services within signal area 510. Accordingly, based on the configuration for the small cells within signal area 510 (e.g., the locations of the small cells), access node 202 may schedule wireless transmissions between an access node and wireless devices.

FIG. 6 illustrates an exemplary method to schedule transmissions between an access node and wireless devices. The method will be discussed with reference to the exemplary communication system 500 illustrated in FIG. 5, however, the method can be implemented with any suitable communication system.

Referring to FIG. 6, at step 602, signal areas may be determined for a plurality of small cells. For example, for a configuration as depicted in system 500A, signals areas may be determined for small cells 504A, 506A, and 508A. For a configuration as depicted in system 500B, signals areas may be determined for small cells 504B, 506B, and 508B. For a configuration as depicted in system 500C, signals areas may be determined for small cells 504C, 506C, and 508C. The signal areas may be determined based on accessing a database that stores small cell locations, signal levels detected (e.g., by access node 502 and/or wireless devices) for the small cells within signal area 510, and any other suitable means.

At step 604, locations may be determined for a plurality of small cells. For example, for a configuration as depicted in system 500A, locations may be determined for small cells 504A, 506A, and 508A. For a configuration as depicted in system 500B, locations may be determined for small cells 504B, 506B, and 508B. For a configuration as depicted in system 500C, locations may be determined for small cells 504C, 506C, and 508C. The locations may be determined based on accessing a database that stores small cell locations, signal levels detected (e.g., by access node 502 and/or wireless devices) for the small cells within signal area 510, and any other suitable means. In an embodiment, the database may store locations (e.g., geographic locations) for deployed small cells, and the database may be updated with new and/or changed locations.

In an embodiment, determining the location of the plurality small cells within signal area 510 may comprise determining the wireless channel conditions for wireless devices covered by each small cell at the determined location, wherein the channel conditions comprise channel conditions for communication between the wireless devices and access node 502. For example, for a configuration as depicted in system 500A, a signal area may be determined for small cell 504A. Accordingly, wireless devices within the determined signal area may be covered by small cell 504A. Channel conditions may be determined for the wireless devices covered by small cell 504A, where the channel conditions may be the channel conditions for communication between the covered wireless devices and access node 502.

For example, a wireless device may comprise a channel quality indicator (CQI) relative to communication with an access node. The CQI may indicate the channel quality for communications between the wireless devices and the access node. In an embodiment, the channel conditions determined for wireless devices covered by small cell 504A may comprise, for instance, the CQI for the wireless device when in communication with access node 502. Wireless channel conditions for wireless devices covered by small cells 506A and 508A may be similarly determined. For configurations as depicted in systems 500B and 500C, wireless channel conditions for wireless devices covered by small cells 504B, 506B, 508B, 504C, 506C, and 508C may be similarly determined. In an embodiment, the CQIs for wireless devices covered by small cells 504B, 506B, and 508B may meet a high CQI threshold while the CQIs for wireless devices covered by small cells 504C, 506C, and 508C may meet a low CQI threshold. The CQIs for wireless devices covered by small cells 504A, 506A, and 508A may comprise a mix of CQIs that meet the high CQI threshold, the low CQI threshold, or neither threshold.

In an embodiment, determining the location of the plurality small cells within signal area 510 may comprise determining a region for each small cell that indicates channel conditions for wireless devices within the determined signal area for each small cell, wherein the channel conditions comprise channel conditions for communication between the wireless devices and access node 502. For example, for a configuration as depicted in system 500A, a signal area may be determined for small cell 504A. Based on the signal area, a region may be determined for small cell 504A. For example signal area 510 may comprise a plurality of regions. The regions may indicate the channel conditions for wireless devices covered by small cells within that region. For example, small cells 504B, 506B, and 508B may be located within a region that comprises a high CQI threshold while small cells 504C, 506C, and 508C may be located within a region that comprises a low CQI threshold. Small cells 504A, 506A, and 508A may be located within a mix of regions that comprise a mix of CQI thresholds.

At step 606, a utilization may be determined for the small cells. In an embodiment, for a configuration as depicted in system 500A, a utilization may be determined for small cells 504A, 506A, and 508A. For example, small cell 504A may communicate with wireless devices and a utilization of small cell 504A may be determined. For example, the utilization may comprise a number of connections with wireless devices (e.g., a number of RRC connections), a throughput for the small cell, a processor load for the small cell, a percentage of resources used (e.g., wireless spectrum resources and/or hardware resources), and the like. The utilization for small cells 506A and 508A may be similarly determined. For configurations as depicted in systems 500B and 500C, the utilizations for small cells 504B, 506B, 508B, 504C, 506C, and 508C may be similarly determined.

At step 608, frame structure may be selected for the access node based on the determined locations for the small cells. For example, based on the determined locations for small cells 504A, 506A and 508A, a frame structure may be selected for access node 502. The frame structure may comprise uplink frames, downlink, frames, or various combinations of these.

For example, in a time division duplex (TDD) system, a frame may comprise a number of subframes (e.g. Transmission Time Intervals, TTIs) that include a mix of uplink subframes and downlink subframes. In some embodiments, a special subframe may also be used, for instance, as a guard between an uplink subframe and a downlink subframe or for any other suitable purpose. When using a TDD structure, an uplink subframe and a downlink subframe may be transmitted over the same frequency but at different times. In an embodiment, a frame structure may comprise uplink subframes and/or downlink subframes, where each frame structure may comprise a different mix of subframes. For example, a first frame structure may comprise 10 subframes, where the order of subframes may comprise downlink, special, uplink, uplink, downlink, downlink, special, uplink, uplink, and downlink. A second frame structure may comprise 10 subframes, where the order of subframes may comprise downlink, special, uplink, uplink, downlink, downlink, downlink, downlink, downlink, and downlink. Other frame structures may comprise various other mixes of special, downlink, and uplink subframe configurations.

In an embodiment, when a number of the plurality of small cells that comprise a location proximate to the edge of the access node signal area meets a threshold criteria, a frame structure that meets a downlink criteria may be selected for access node 502. For example, where a number of small cells (e.g., a percentage of small cells within signal area 510, an absolute number of small cells, or any other suitable number) with a location proximate to the edge of signal area 510 meets a threshold criteria (e.g., threshold percentage, threshold number of small cells, and the like), a frame structure that meets a downlink criteria may be selected for access node 502. In an embodiment, a downlink criteria may comprise a frame structure with a minimum number of downlink subframes (e.g., minimum absolute number or minimum percentage of the frame). For example, a frame structure that meets a downlink criteria may comprise at least a threshold number of subframes that comprise downlink subframes (e.g., 5 subframes, 6 subframes, 7 subframes, at least 50% of subframes, at least 60% of subframes, at least 70% of subframes, and the like).

In an embodiment, for a configuration as depicted in system 500C, small cells 504C, 506C, and 508C may comprise locations proximate to the edge of signal area 510. Accordingly, the number of small cells that comprise a location proximate to the edge of signal area 510 may meet a threshold criteria, and a frame structure that meets a downlink criteria may be selected for access node 502. For configurations as depicted in systems 500A and 500B, the number of small cells that comprise a location proximate to the edge of signal area 510 for each configuration may not meet the threshold criteria.

In an embodiment, when a number of the plurality of small cells that comprise a location within a region that comprises a low CQI threshold meets a threshold criteria, a frame structure that meets a downlink criteria may be selected for access node 502. For example, where a number of small cells (e.g., a percentage of small cells within signal area 510, an absolute number of small cells, or any other suitable number) with a location within a region that comprises a low CQI threshold meets a threshold criteria (e.g., threshold percentage, threshold number of small cells, and the like), a frame structure that meets a downlink criteria may be selected for access node 502. For example, for a configuration as depicted in system 500C, small cells 504C, 506C and 508C may comprise locations within a region that comprises a low CQI threshold. Accordingly, the number of small cells within a region that comprises a low CQI threshold may meet a threshold criteria, and a frame structure that meets a downlink criteria may be selected for access node 502. For configurations as depicted in systems 500A and 500B, the number of small cells within a region that comprises a low CQI threshold for each configuration may not meet the threshold criteria.

In an embodiment, when a number of the plurality of small cells that comprise a location proximate to access node 502 meets a threshold criteria, a frame structure that meets an uplink criteria may be selected for access node 502. For example, where a number of small cells (e.g., a percentage of small cells within signal area 510, an absolute number of small cells, or any other suitable number) with a location proximate to access node 502 meets a threshold criteria (e.g., threshold percentage, threshold number of small cells, and the like), a frame structure that meets an uplink criteria may be selected for access node 502. In an embodiment, an uplink criteria may comprise a frame structure with a minimum number of uplink subframes (e.g., minimum absolute number or minimum percentage of the frame). For example, a frame structure that meets an uplink criteria may comprise at least a threshold number of subframes that comprise uplink subframes (e.g., 3 subframes, 4 subframes, 5 subframes, at least 30% of subframes, at least 40% of subframes, at least 50% of subframes, and the like).

In an embodiment, for a configuration as depicted in system 500B, small cells 504B, 506B and 508B may comprise locations proximate to access node 502. Accordingly, the number of small cells that comprise a location proximate to access node 502 may meet a threshold criteria, and a frame structure that meets a uplink criteria may be selected for access node 502. For configurations as depicted in systems 500A and 500C, the number of small cells that comprise a location proximate to access node 502 for each configuration may not meet the threshold criteria.

In an embodiment, when a number of the plurality of small cells that comprise a location within a region that comprises a high CQI threshold meets a threshold criteria, a frame structure that meets a uplink criteria may be selected for access node 502. For example, where a number of small cells (e.g., a percentage of small cells within signal area 510, an absolute number of small cells, or any other suitable number) with a location within a region that comprises a high CQI threshold meets a threshold criteria (e.g., threshold percentage, threshold number of small cells, and the like), a frame structure that meets a uplink criteria may be selected for access node 502. For example, for a configuration as depicted in system 500B, small cells 504B, 506B and 508B may comprise locations within a region that comprises a high CQI threshold. Accordingly, the number of small cells within a region that comprises a high CQI threshold may meet a threshold criteria, and a frame structure that meets a uplink criteria may be selected for access node 502. For configurations as depicted in systems 500A and 500B, the number of small cells within a region that comprises a high CQI threshold for each configuration may not meet the threshold criteria.

In an embodiment, when a number of the plurality of small cells that comprise a location proximate to the edge of the access node signal area meets a threshold criteria and a utilization for the plurality of small cells that comprise a location proximate to the edge of the access node signal area meets a utilization criteria, a frame structure that meets a downlink criteria may be selected for access node 502. For example, where a number of small cells (e.g., a percentage of small cells within signal area 510, an absolute number of small cells, or any other suitable number) with a location proximate to the edge of signal area 510 meets a threshold criteria (e.g., threshold percentage, threshold number of small cells, and the like) and a utilization for the small cells that comprise a location proximate to the edge of the access node signal area meets a utilization criteria (e.g. processor usage above a threshold, a threshold number of RRC connections, and the like), a frame structure that meets a downlink criteria may be selected for access node 502. For example, for a configuration as depicted in system 500C, small cells 504C, 506C and 508C may comprise locations proximate to the edge of signal area 510. Accordingly, the number of small cells that comprise a location proximate to the edge of signal area 510 may meet a threshold criteria. Where the utilization for small cells 504C, 506C, and 508C also meets a utilization criteria, a frame structure that meets a downlink criteria may be selected for access node 502. For configurations as depicted in systems 500A and 500B, the number of small cells that comprise a location proximate to the edge of signal area 510 for each configuration may not meet the threshold criteria.

In an embodiment, when a number of the plurality of small cells that comprise a location within a region that comprises a low CQI threshold meets a threshold criteria and a utilization for the plurality of small cells that comprise a location within a region that comprises a low CQI threshold meets a utilization criteria, a frame structure that meets a downlink criteria may be selected for access node 502. For example, where a number of small cells (e.g., a percentage of small cells within signal area 510, an absolute number of small cells, or any other suitable number) with a location within a region that comprises a low CQI threshold meets a threshold criteria (e.g., threshold percentage, threshold number of small cells, and the like) and a utilization for the small cells that comprise a location within a region that comprises a low CQI threshold meets a utilization criteria (e.g. processor usage above a threshold, a threshold number of RRC connections, and the like), a frame structure that meets a downlink criteria may be selected for access node 502. For example, for a configuration as depicted in system 500C, small cells 504C, 506C and 508C may comprise locations within a region that comprises a low CQI threshold. Accordingly, the number of small cells within a region that comprises a low CQI threshold may meet a threshold criteria. Where the utilization for small cells 504C, 506C, and 508C also meets a utilization criteria, a frame structure that meets a downlink criteria may be selected for access node 502. For configurations as depicted in systems 500A and 500B, the number of small cells within a region that comprises a low CQI threshold for each configuration may not meet the threshold criteria.

In an embodiment, when a number of the plurality of small cells that comprise a location proximate to the access node meets a threshold criteria and a utilization for the plurality of small cells that comprise a location proximate to the access node meets a utilization criteria, a frame structure that meets an uplink criteria may be selected for access node 502. For example, where a number of small cells (e.g., a percentage of small cells within signal area 510, an absolute number of small cells, or any other suitable number) with a location proximate to access node 502 meets a threshold criteria (e.g., threshold percentage, threshold number of small cells, and the like) and a utilization for the small cells that comprise a location proximate to access node 502 meets a utilization criteria (e.g. processor usage above a threshold, a threshold number of RRC connections, and the like), a frame structure that meets an uplink criteria may be selected for access node 502. For example, for a configuration as depicted in system 500B, small cells 504B, 506B and 508B may comprise locations proximate to access node 502. Accordingly, the number of small cells that comprise a location proximate to access node 502 may meet a threshold criteria. Where the utilization for small cells 504B, 506B, and 508B also meets a utilization criteria, a frame structure that meets an uplink criteria may be selected for access node 502. For configurations as depicted in systems 500A and 500C, the number of small cells that comprise a location proximate to the edge of signal area 510 for each configuration may not meet the threshold criteria.

In an embodiment, when a number of the plurality of small cells that comprise a location within a region that comprises a high CQI threshold meets a threshold criteria and a utilization for the plurality of small cells that comprise a location within a region that comprises a high CQI threshold meets a utilization criteria, a frame structure that meets an uplink criteria may be selected for access node 502. For example, where a number of small cells (e.g., a percentage of small cells within signal area 510, an absolute number of small cells, or any other suitable number) with a location within a region that comprises a high CQI threshold meets a threshold criteria (e.g., threshold percentage, threshold number of small cells, and the like) and a utilization for the small cells that comprise a location within a region that comprises a high CQI threshold meets a utilization criteria (e.g. processor usage above a threshold, a threshold number of RRC connections, and the like), a frame structure that meets an uplink criteria may be selected for access node 502. For example, for a configuration as depicted in system 500B, small cells 504B, 506B and 508B may comprise locations within a region that comprises a high CQI threshold. Accordingly, the number of small cells within a region that comprises a high CQI threshold may meet a threshold criteria. Where the utilization for small cells 504B, 506B, and 508B also meets a utilization criteria, a frame structure that meets an uplink criteria may be selected for access node 502. For configurations as depicted in systems 500A and 500B, the number of small cells within a region that comprises a high CQI threshold for each configuration may not meet the threshold criteria.

In an embodiment, the selected frame structure may be used for communication between the access node and wireless devices and for communication between the small cells and wireless devices. For example, the selected frame structure may be used for communication between access node 502 and wireless devices and for communication between small cells 504B, 506B, and 508B and wireless devices. In another example, a first frame structure may be used for communication between access node 502 and wireless devices and a second frame structure may be used for communication between small cells 504B, 506B, and 508B and wireless devices.

In an embodiment, when a number of the plurality of small cells that comprise a location proximate to the edge of the access node signal area meets a threshold criteria, a frame structure that meets a downlink criteria may be selected for access node 502 and a frame structure that meets an uplink criteria may be selected for the small cells that comprise a location proximate to the edge of the access node signal area. For example, where a number of small cells (e.g., a percentage of small cells within signal area 510, an absolute number of small cells, or any other suitable number) with a location proximate to the edge of signal area 510 meets a threshold criteria (e.g., threshold percentage, threshold number of small cells, and the like), a frame structure that meets a downlink criteria may be selected for access node 502 and a frame structure that meets an uplink criteria may be selected for the small cells with a location proximate to the edge of signal area 510. In an embodiment, for a configuration as depicted in system 500C, small cells 504C, 506C, and 508C may comprise locations proximate to the edge of signal area 510. Accordingly, the number of small cells that comprise a location proximate to the edge of signal area 510 may meet a threshold criteria. A frame structure that meets a downlink criteria may be selected for access node 502 and a frame structure that meets an uplink criteria may be selected for small cells 504C, 506C, and 508C.

In an embodiment, when a number of the plurality of small cells that comprise a location within a region that comprises a low CQI threshold meets a threshold criteria, a frame structure that meets a downlink criteria may be selected for access node 502 and a frame structure that meets an uplink criteria may be selected for the small cells that comprise a location within a region that comprises a low CQI threshold. For example, where a number of small cells (e.g., a percentage of small cells within signal area 510, an absolute number of small cells, or any other suitable number) with a location within a region that comprises a low CQI threshold meets a threshold criteria (e.g., threshold percentage, threshold number of small cells, and the like), a frame structure that meets a downlink criteria may be selected for access node 502 and a frame structure that meets an uplink criteria may be selected for the small cells that comprise a location within a region that comprises a low CQI threshold. For example, for a configuration as depicted in system 500C, small cells 504C, 506C and 508C may comprise locations within a region that comprises a low CQI threshold. Accordingly, the number of small cells within a region that comprises a low CQI threshold may meet a threshold criteria. A frame structure that meets a downlink criteria may be selected for access node 502 and a frame structure that meets an uplink criteria may be selected for small cells 504C, 506C, and 508C.

In an embodiment, when a number of the plurality of small cells that comprise a location proximate to access node 502 meets a threshold criteria, a frame structure that meets a uplink criteria may be selected for access node 502 and a frame structure that meets a downlink criteria may be selected for the small cells that comprise a location proximate to the edge of the access node signal area. For example, where a number of small cells (e.g., a percentage of small cells within signal area 510, an absolute number of small cells, or any other suitable number) with a location proximate to access node 502 meets a threshold criteria (e.g., threshold percentage, threshold number of small cells, and the like), a frame structure that meets a uplink criteria may be selected for access node 502 and a frame structure that meets a downlink criteria may be selected for the small cells that comprise a location proximate to the edge of the access node signal area. In an embodiment, for a configuration as depicted in system 500B, small cells 504B, 506B and 508B may comprise locations proximate to access node 502. Accordingly, the number of small cells that comprise a location proximate to access node 502 may meet a threshold criteria. A frame structure that meets an uplink criteria may be selected for access node 502 and a frame structure that meets a downlink criteria may be selected for small cells 504B, 506B, and 508B.

In an embodiment, when a number of the plurality of small cells that comprise a location within a region that comprises a high CQI threshold meets a threshold criteria, a frame structure that meets a uplink criteria may be selected for access node 502 and a frame structure that meets a downlink criteria may be selected for the small cells that comprise a location within a region that comprises a high CQI threshold. For example, where a number of small cells (e.g., a percentage of small cells within signal area 510, an absolute number of small cells, or any other suitable number) with a location within a region that comprises a high CQI threshold meets a threshold criteria (e.g., threshold percentage, threshold number of small cells, and the like), a frame structure that meets a uplink criteria may be selected for access node 502 and a frame structure that meets a downlink criteria may be selected for the small cells that comprise a location within a region that comprises a high CQI threshold. For example, for a configuration as depicted in system 500B, small cells 504B, 506B and 508B may comprise locations within a region that comprises a high CQI threshold. Accordingly, the number of small cells within a region that comprises a high CQI threshold may meet a threshold criteria. A frame structure that meets an uplink criteria may be selected for access node 502 and a frame structure that meets a downlink criteria may be selected for small cells 504B, 506B, and 508B.

In an embodiment, where the access node communicates with a different frame structure than the small cells, the small cells may implement a blanking scheme. For example, an enhanced inter-cell interference coordination (eICIC) scheme may be implemented such that almost blank subframes (ABS) are used to mitigate against interference between the access nodes and the small cells. For example, a first frame structure may be used for communication between access node 502 and wireless devices and a second frame structure may be used for communication between the small cells and wireless devices. Accordingly, where a conflict between the first frame structure and the second frame structure exists, the small cells may implement an ABS. For example, where the first frame structure indicates a downlink subframe at a particular TTI and the second frame structure indicates an uplink subframe at the particular TTI, the small cells may implement an ABS rather than the uplink subframe.

In an embodiment, a utilization for the access node may be determined, and the small cells may implement a blanking scheme based on the utilization for the access nodes. For example, a utilization for access node 502 may comprise a number of connections with wireless devices (e.g., a number of RRC connections), a throughput for the access node, a processor load for the access node, a percentage of resources used (e.g., wireless spectrum resources and/or hardware resources), and the like. Where the utilization for access node 502 meets a utilization criteria (e.g. processor usage above a threshold, a threshold number of RRC connections, and the like), the small cells may implement a blanking scheme. Where the utilization for access node 502 does not meet the utilization criteria, the small cells may not implement a blanking scheme.

At step 610, data may be transmitted from the access node to a plurality of wireless devices based on the selected scheduling algorithm. For example, access node 502 may transmit data to a plurality of wireless devices using the selected scheduling algorithm. In an embodiment, the communication may comprise communicating data from access node 502 to a wireless device (e.g., downlink communication) using a downlink subframe and communicating data from a wireless device to access node 502 (e.g., uplink communication) using an uplink subframe.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 7:
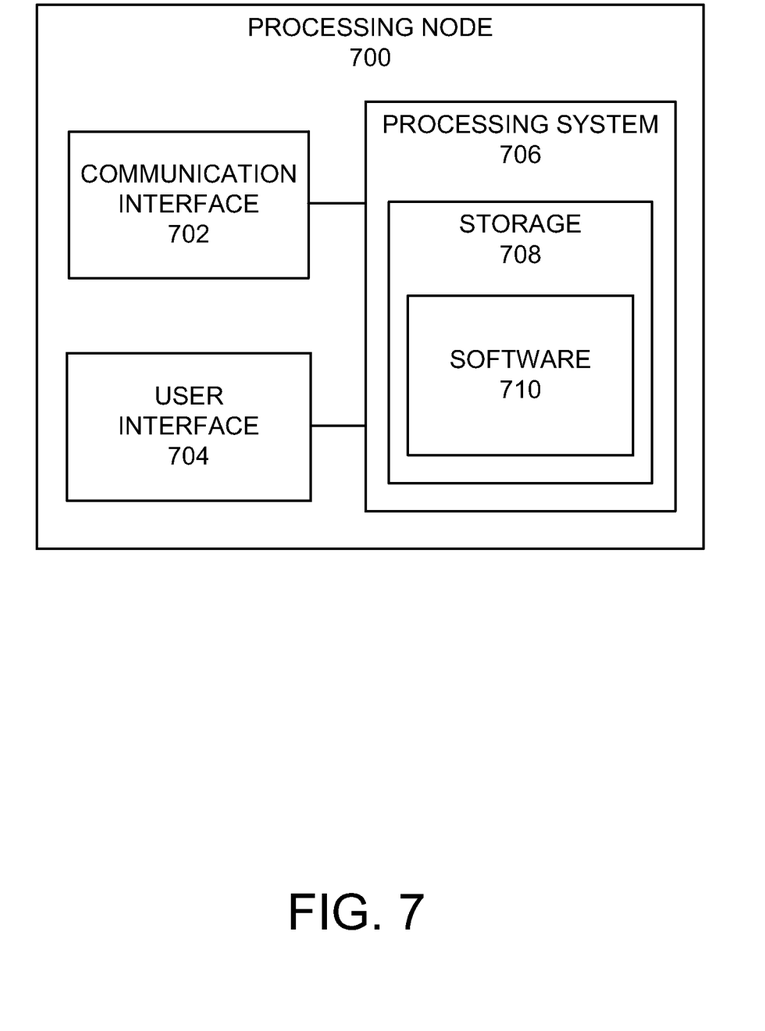
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to determine a communication access node for a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include controller node 408 and gateway node 410. Processing node 700 can also be an adjunct or component of a network element, such as an element of access nodes 106 or 406, an element of small cells 108 or 408, and the like. Processing node 700 can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for scheduling transmissions between an access node and wireless devices, the method comprising:
   determining locations for a plurality of small cells within an access node signal area, wherein the determined locations are relative to an edge of the access node signal area and a location of the access node;
   selecting, based on the determined locations for the plurality of small cells, a frame structure used by the access node to communicate with a plurality of wireless devices; and
   communicating data between the access node and a plurality of wireless devices based on the selected frame structure.

2. The method of claim 1, wherein, when a number of the plurality of small cells that comprise a location proximate to the edge of the access node signal area meets a threshold criteria, a frame structure that meets a downlink criteria is selected.

3. The method of claim 1, wherein, when a number of the plurality of small cells that comprise a location proximate to the location of the access node meets a threshold criteria, a frame structure that meets an uplink criteria is selected.

4. The method of claim 1, further comprising determining a utilization for each of the plurality of small cells.

5. The method of claim 4, wherein, when a number of the plurality of small cells that comprise a location proximate to the edge of the access node signal area meets a threshold criteria and a utilization for the plurality of small cells that comprise a location proximate to the edge of the access node signal area meets a utilization criteria, a frame structure that meets a downlink criteria is selected.

6. The method of claim 4, wherein, when a number of the plurality of small cells that comprise a location proximate to the location of the access node meets a threshold criteria and a utilization for the plurality of small cells that comprise a location proximate to the location of the access node meets a utilization criteria, a frame structure that meets an uplink criteria is selected.

7. The method of claim 4, further comprising:
   selecting, when a number of the plurality of small cells that comprise a location proximate to the edge of the access node signal area meets a threshold criteria, a frame structure that meets a downlink criteria for the access node; and
   selecting, when the number of the plurality of small cells that comprise a location proximate to the edge of the access node signal area meets a threshold criteria, a frame structure that meets an uplink criteria for the plurality of small cells that comprise a location proximate to the edge of the access node signal area.

8. The method of claim 4, further comprising:
   determining a utilization for the access node; and
   instructing the plurality of small cells that comprise a location proximate to the edge of the access node signal area to perform frame conflict blanking when the determined utilization for the access node meets a utilization criteria and not to perform frame conflict blanking when the determined utilization for the access nodes does not meet the utilization criteria.

9. The method of claim 1, wherein the plurality of small cells communicate with a plurality of wireless devices using the selected frame structure.

10. The method of claim 1, wherein determining the location of the plurality small cells within the access node signal area comprises determining the wireless channel conditions for wireless devices covered by each small cell at the determined location, wherein the channel conditions comprise channel conditions for communication between the wireless devices and the access node.

11. The method of claim 1, wherein determining the location of the plurality small cells within the access node signal area comprises:
   determining a signal area for each small cell within the access node signal area; and
   determining a region for each small cell that indicates channel conditions for wireless devices within the determined signal area for each small cell, wherein the channel conditions comprise channel conditions for communication between the wireless devices and the access node.

12. A system for scheduling transmissions between an access node and wireless devices, the system comprising:
   a processing node with a processor configured to:
      determine locations for a plurality of small cells within an access node signal area, wherein the determined locations are relative to an edge of the access node signal area and a location of the access node;
      select, based on the determined locations for the plurality of small cells, a frame structure used by the access node to communicate with a plurality of wireless devices; and
      communicate data between the access node and a plurality of wireless devices based on the selected frame structure.

13. The system of claim 12, wherein, when a number of the plurality of small cells that comprise a location proximate to the edge of the access node signal area meets a threshold criteria, a frame structure that meets a downlink criteria is selected.

14. The system of claim 12, wherein, when a number of the plurality of small cells that comprise a location proximate to the location of the access node meets a threshold criteria, a frame structure that meets an uplink criteria is selected.

15. The system of claim 12, further comprising determining a utilization for each of the plurality of small cells.

16. The system of claim 15, wherein, when a number of the plurality of small cells that comprise a location proximate to the edge of the access node signal area meets a threshold criteria and a utilization for the plurality of small cells that comprise a location proximate to the edge of the access node signal area meets a utilization criteria, a frame structure that meets a downlink criteria is selected.

17. The system of claim 15, wherein, when a number of the plurality of small cells that comprise a location proximate to the location of the access node meets a threshold criteria and a utilization for the plurality of small cells that comprise a location proximate to the location of the access node meets a utilization criteria, a frame structure that meets an uplink criteria is selected.

18. The system of claim 15, where the processing node is further configured to:
   select, when a number of the plurality of small cells that comprise a location proximate to the edge of the access node signal area meets a threshold criteria, a frame structure that meets a downlink criteria for the access node; and
   select, when the number of the plurality of small cells that comprise a location proximate to the edge of the access node signal area meets a threshold criteria, a frame structure that meets an uplink criteria for the plurality of small cells that comprise a location proximate to the edge of the access node signal area.

\* \* \* \* \*